United States Patent
Chen et al.

(10) Patent No.: US 11,863,473 B2
(45) Date of Patent: Jan. 2, 2024

(54) CODING OVER MULTIPLE RESOURCE UNITS (RU) IN EXTREMELY HIGH THROUGHPUT (EHT) SYSTEMS

(71) Applicant: Intel Corporation, Santa Clara, CA (US)

(72) Inventors: Xiaogang Chen, Portland, OR (US); Qinghua Li, San Ramon, CA (US); Feng Jiang, Sunnyvale, CA (US); Ziv Avital, Kadima (IL); Assaf Gurevitz, Ramat Hasharon (IL); Robert J. Stacey, Portland, OR (US); Chen Kojokaro, Yoqneam Illit (IL); Thomas J. Kenney, Portland, OR (US); Ehud Reshef, Kiryat Tivon (IL); Daniel F. Bravo, Hillsboro, OR (US); Laurent Cariou, Portland, OR (US)

(73) Assignee: Intel Corporation, Santa Clara, CA (US)

(*) Notice: Subject to any disclaimer, the term of this patent is extended or adjusted under 35 U.S.C. 154(b) by 174 days.

(21) Appl. No.: 17/352,026

(22) Filed: Jun. 18, 2021

(65) Prior Publication Data

US 2021/0314113 A1 Oct. 7, 2021

Related U.S. Application Data

(63) Continuation of application No. 16/728,239, filed on Dec. 27, 2019, now Pat. No. 11,343,035.
(Continued)

(51) Int. Cl.
*H04L 5/00* (2006.01)
*H04L 1/00* (2006.01)
(Continued)

(52) U.S. Cl.
CPC .......... *H04L 5/0044* (2013.01); *H04L 1/0071* (2013.01); *H04L 5/0007* (2013.01);
(Continued)

(58) Field of Classification Search
CPC ... H04W 72/044; H04W 72/56; H04W 84/12; H04W 88/02; H04L 5/0062;
(Continued)

(56) References Cited

U.S. PATENT DOCUMENTS

2009/0082002 A1   3/2009  Kim et al.
2016/0050672 A1*  2/2016  Chen ................ H04L 1/0071
                                                 370/329
(Continued)

OTHER PUBLICATIONS

"U.S. Appl. No. 16/728,239, Response filed Dec. 21, 2021 to Non Final Office Action dated Sep. 21, 2021", 9 pgs.
(Continued)

*Primary Examiner* — Maharishi V Khirodhar
*Assistant Examiner* — Kenneth P Hunt
(74) *Attorney, Agent, or Firm* — Schwegman Lundberg & Woessner, P.A.

(57) ABSTRACT

Embodiments of an access point (AP), station (STA) and method of communication are generally described herein. The STA may determine a portion of a channel occupied by an incumbent device. The STA may refrain from communication in a first subset of resource units (RUs) that overlap the portion of the channel occupied by the incumbent device. The STA may determine a combined RU that comprises two or more RUs of a second subset of RUs that do not overlap the portion of the channel occupied by the incumbent device. The STA may encode a physical layer convergence procedure protocol data unit (PPDU) for transmission in the combined RU. The PPDU may be encoded in accordance with joint coding across the RUs of the combined RU.

8 Claims, 14 Drawing Sheets

Related U.S. Application Data

(60) Provisional application No. 62/858,499, filed on Jun. 7, 2019, provisional application No. 62/816,485, filed on Mar. 11, 2019.

(51) Int. Cl.
*H04W 72/04* (2023.01)
*H04W 72/10* (2009.01)
*H04W 72/044* (2023.01)
*H04W 72/56* (2023.01)
*H04W 88/02* (2009.01)
*H04W 84/12* (2009.01)

(52) U.S. Cl.
CPC ......... *H04L 5/0039* (2013.01); *H04W 72/044* (2013.01); *H04W 72/56* (2023.01); *H04W 84/12* (2013.01); *H04W 88/02* (2013.01)

(58) Field of Classification Search
CPC ... H04L 1/0071; H04L 5/0044; H04L 5/0039; H04L 5/0007
See application file for complete search history.

(56) References Cited

U.S. PATENT DOCUMENTS

| | | |
|---|---|---|
| 2017/0006608 A1 | 1/2017 | Josiam et al. |
| 2017/0064718 A1 | 3/2017 | Bharadwaj et al. |
| 2017/0280354 A1 | 9/2017 | Huang et al. |
| 2018/0019900 A1 | 1/2018 | Sun et al. |
| 2019/0109684 A1 | 4/2019 | Chen et al. |
| 2019/0141570 A1* | 5/2019 | Verma ................. H04W 28/065 |
| 2019/0253296 A1 | 8/2019 | Chen et al. |
| 2019/0327740 A1* | 10/2019 | Verma ..................... H04L 5/001 |
| 2020/0136773 A1 | 4/2020 | Chen et al. |
| 2021/0045151 A1 | 2/2021 | Chen et al. |

OTHER PUBLICATIONS

"U.S. Appl. No. 16/728,239, Notice of Allowance dated Jan. 26, 2022", 6 pgs.

"U.S. Appl. No. 16/728,239, Non Final Office Action dated Sep. 21, 2021", 14 pgs.

* cited by examiner

CODING OVER MULTIPLE RESOURCE UNITS (RU) IN EXTREMELY HIGH THROUGHPUT (EHT) SYSTEMS

PRIORITY CLAIM

This application is a continuation of U.S. patent application Ser. No. 16/728,239, filed Dec. 27, 2019, which claims priority under 35 USC 119(e) to U.S. Provisional Patent Application Ser. No. 62/816,485, filed Mar. 11, 2019, and to U.S. Provisional Patent Application Ser. No. 62/858,499, filed Jun. 7, 2019, all of which are incorporated herein by reference in their entirety.

TECHNICAL FIELD

Embodiments pertain to wireless networks and wireless communications. Some embodiments relate to wireless local area networks (WLANs) and Wi-Fi networks including networks operating in accordance with the IEEE 802.11 family of standards. Some embodiments relate to Extremely High Throughput (EHT) protocols. Some embodiments relate to methods, computer readable media, and apparatus for coding over multiple resource units (RUs) in EHT systems.

BACKGROUND

Efficient use of the resources of a wireless local-area network (WLAN) is important to provide bandwidth and acceptable response times to the users of the WLAN. However, often there are many devices trying to share the same resources and some devices may be limited by the communication protocol they use or by their hardware bandwidth. Moreover, wireless devices may need to operate with both newer protocols and with legacy device protocols.

BRIEF DESCRIPTION OF THE DRAWINGS

The present disclosure is illustrated by way of example and not limitation in the figures of the accompanying drawings, in which like references indicate similar elements and in which.

DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
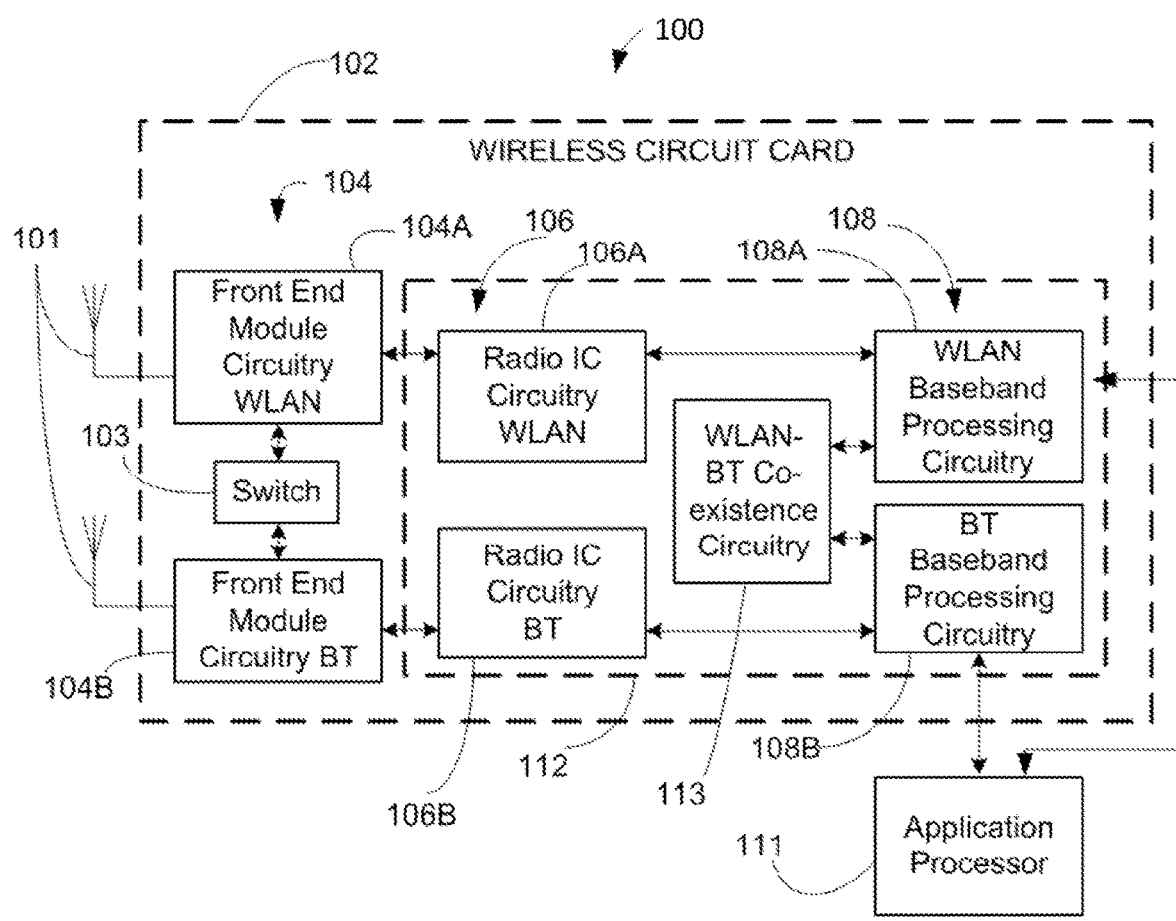
FIG. 1 is a block diagram of a radio architecture in accordance with some embodiments.

FIG. 1 is a block diagram of a radio architecture 100 in accordance with some embodiments. Radio architecture 100 may include radio front-end module (FEM) circuitry 104, radio IC circuitry 106 and baseband processing circuitry 108. Radio architecture 100 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 104 may include a WLAN or Wi-Fi FEM circuitry 104A and a Bluetooth (BT) FEM circuitry 104B. The WLAN FEM circuitry 104A may include a receive signal path comprising circuitry configured to operate on WLAN RF signals received from one or more antennas 101, to amplify the received signals and to provide the amplified versions of the received signals to the WLAN radio IC circuitry 106A for further processing. The BT FEM circuitry 104B may include a receive signal path which may include circuitry configured to operate on BT RF signals received from one or more antennas 101, to amplify the received signals and to provide the amplified versions of the received signals to the BT radio IC circuitry 106B for further processing. FEM circuitry 104A may also include a transmit signal path which may include circuitry configured to amplify WLAN signals provided by the radio IC circuitry 106A for wireless transmission by one or more of the antennas 101. In addition, FEM circuitry 104B may also include a transmit signal path which may include circuitry configured to amplify BT signals provided by the radio IC circuitry 106B for wireless transmission by the one or more antennas. In the embodiment of FIG. 1, although FEM 104A and FEM 104B are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 106 as shown may include WLAN radio IC circuitry 106A and BT radio IC circuitry 106B. The WLAN radio IC circuitry 106A may include a receive signal path which may include circuitry to down-convert WLAN RF signals received from the FEM circuitry 104A and provide baseband signals to WLAN baseband processing circuitry 108A. BT radio IC circuitry 106B may in turn include a receive signal path which may include circuitry to down-convert BT RF signals received from the FEM circuitry 104B and provide baseband signals to BT baseband processing circuitry 108B. WLAN radio IC circuitry 106A may also include a transmit signal path which may include circuitry to up-convert WLAN baseband signals provided by the WLAN baseband processing circuitry 108A and provide WLAN RF output signals to the FEM circuitry 104A for subsequent wireless transmission by the one or more antennas 101. BT radio IC circuitry 106B may also include a transmit signal path which may include circuitry to up-convert BT baseband signals provided by the BT baseband processing circuitry 108B and provide BT RF output signals to the FEM circuitry 104B for subsequent wireless transmission by the one or more antennas 101. In the embodiment of FIG. 1, although radio IC circuitries 106A and 106B are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 108 may include a WLAN baseband processing circuitry 108A and a BT baseband processing circuitry 108B. The WLAN baseband processing circuitry 108A may include a memory, such as, for example, a set of RAM arrays in a Fast Fourier Transform or Inverse Fast Fourier Transform block (not shown) of the WLAN baseband processing circuitry 108A. Each of the WLAN baseband circuitry 108A and the BT baseband circuitry 108B may further include one or more processors and control logic to process the signals received from the corresponding WLAN or BT receive signal path of the radio IC circuitry 106, and to also generate corresponding WLAN or BT baseband signals for the transmit signal path of the radio IC circuitry 106. Each of the baseband processing circuitries 108A and 108B may further include physical layer (PHY) and medium access control layer (MAC) circuitry, and may further interface with application processor 111 for generation and processing of the baseband signals and for controlling operations of the radio IC circuitry 106.

Referring still to FIG. 1, according to the shown embodiment, WLAN-BT coexistence circuitry 113 may include logic providing an interface between the WLAN baseband circuitry 108A and the BT baseband circuitry 108B to enable use cases requiring WLAN and BT coexistence. In addition, a switch 103 may be provided between the WLAN FEM circuitry 104A and the BT FEM circuitry 104B to allow switching between the WLAN and BT radios according to application needs. In addition, although the antennas 101 are depicted as being respectively connected to the WLAN FEM circuitry 104A and the BT FEM circuitry 104B, embodiments include within their scope the sharing of one or more antennas as between the WLAN and BT FEMs, or the provision of more than one antenna connected to each of FEM 104A or 104B.

In some embodiments, the front-end module circuitry 104, the radio IC circuitry 106, and baseband processing circuitry 108 may be provided on a single radio card, such as wireless radio card 102. In some other embodiments, the one or more antennas 101, the FEM circuitry 104 and the radio IC circuitry 106 may be provided on a single radio card. In some other embodiments, the radio IC circuitry 106 and the baseband processing circuitry 108 may be provided on a single chip or integrated circuit (IC), such as IC 112.

In some embodiments, the wireless radio card 102 may include a WLAN radio card and may be configured for Wi-Fi communications, although the scope of the embodiments is not limited in this respect. In some of these embodiments, the radio architecture 100 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 100 may be part of a Wi-Fi communication station (STA) such as a wireless access point (AP), a base station or a mobile device including a Wi-Fi device. In some of these embodiments, radio architecture 100 may be configured to transmit and receive signals in accordance with specific communication standards and/or protocols, such as any of the Institute of Electrical and Electronics Engineers (IEEE) standards including, IEEE 802.11n-2009, IEEE 802.11-2012, IEEE 802.11-2016, IEEE 802.11ac, and/or IEEE 802.11ax standards, Extremely High Throughput (EHT) standards, and/or proposed specifications for WLANs, although the scope of embodiments is not limited in this respect. Radio architecture 100 may also be suitable to transmit and/or receive communications in accordance with other techniques and standards.

In some embodiments, the radio architecture 100 may be configured to communicate in accordance with EHT techniques/protocols and/or other 802.11 techniques/protocols. In these embodiments, the radio architecture 100 may be configured to communicate in accordance with an OFDMA technique, although the scope of the embodiments is not limited in this respect.

In some other embodiments, the radio architecture 100 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1, the BT baseband circuitry 108B may be compliant with a Bluetooth (BT) connectivity standard such as Bluetooth, Bluetooth 4.0 or Bluetooth 5.0, or any other iteration of the Bluetooth Standard. In embodiments that include BT functionality as shown for example in FIG. 1, the radio architecture 100 may be configured to establish a BT synchronous connection oriented (SCO) link and/or a BT low energy (BT LE) link. In some of the embodiments that include functionality, the radio architecture 100 may be configured to establish an extended SCO (eSCO) link for BT communications, although the scope of the embodiments is not limited in this respect. In some of these embodiments that include a BT functionality, the radio architecture may be configured to engage in a BT Asynchronous Connection-Less (ACL) communications, although the scope of the embodiments is not limited in this respect. In some embodiments, as shown in FIG. 1, the functions of a BT radio card and WLAN radio card may be combined on a single wireless radio card, such as single wireless radio card 102, although embodiments are not so limited, and include within their scope discrete WLAN and BT radio cards In some embodiments, the radio-architecture 100 may include other radio cards, such as a cellular radio card configured for cellular (e.g., 3GPP such as LTE, LTE-Advanced or 5G communications).

In some IEEE 802.11 embodiments, the radio architecture 100 may be configured for communication over various channel bandwidths including bandwidths having center frequencies of about 900 MHz, 2.4 GHz, 5 GHz, and bandwidths of about 1 MHz, 2 MHz, 2.5 MHz, 4 MHz, 5 MHz, 8 MHz, 10 MHz, 16 MHz, 20 MHz, 40 MHz, 80 MHz (with contiguous bandwidths) or 80+80 MHz (160 MHz) (with non-contiguous bandwidths). In some embodiments, a 320 MHz channel bandwidth may be used. The scope of the embodiments is not limited with respect to the above center frequencies however.

Figure 2:
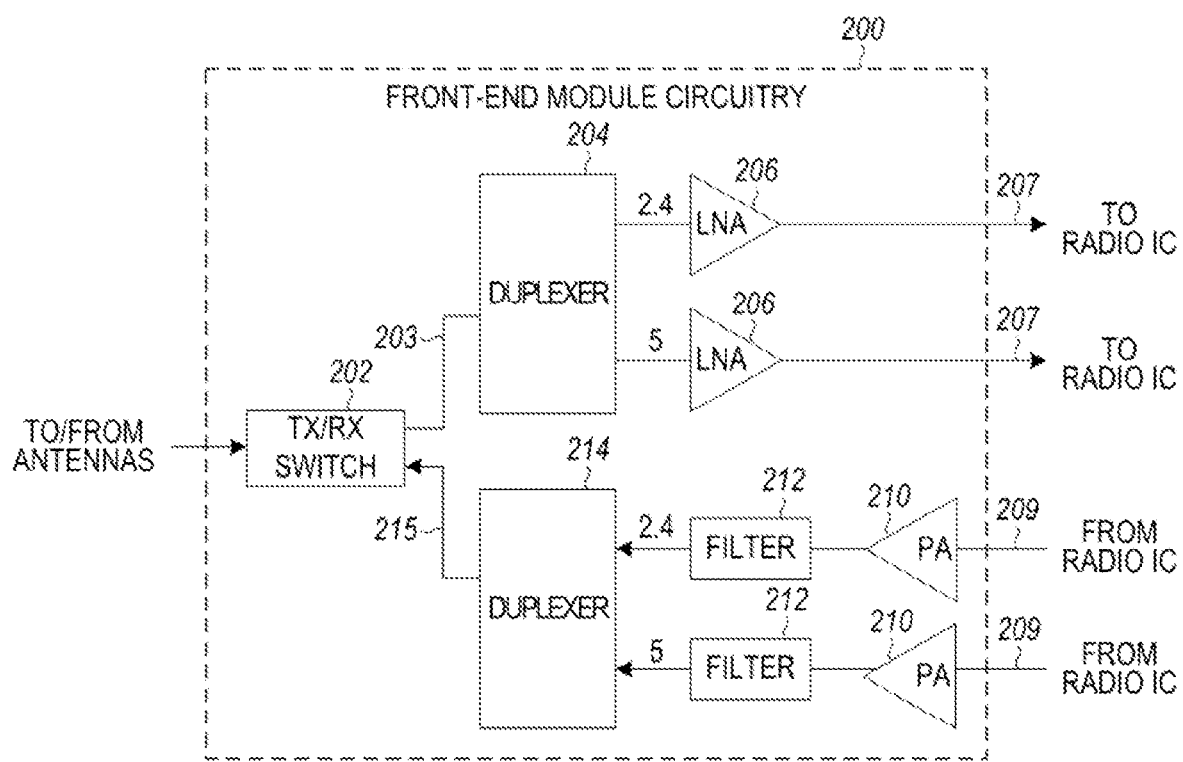
FIG. 2 illustrates a front-end module circuitry for use in the radio architecture of FIG. 1 in accordance with some embodiments.

FIG. 2 illustrates FEM circuitry 200 in accordance with some embodiments. The FEM circuitry 200 is one example of circuitry that may be suitable for use as the WLAN and/or BT FEM circuitry 104A/104B (FIG. 1), although other circuitry configurations may also be suitable.

In some embodiments, the FEM circuitry 200 may include a TX/RX switch 202 to switch between transmit mode and receive mode operation. The FEM circuitry 200 may include a receive signal path and a transmit signal path. The receive signal path of the FEM circuitry 200 may include a low-noise amplifier (LNA) 206 to amplify received RF signals 203 and provide the amplified received RF signals 207 as an output (e.g., to the radio IC circuitry 106 (FIG. 1)). The transmit signal path of the circuitry 200 may include a power amplifier (PA) to amplify input RF signals 209 (e.g., provided by the radio IC circuitry 106), and one or more filters 212, such as band-pass filters (BPFs), low-pass filters (LPFs) or other types of filters, to generate RF signals 215 for subsequent transmission (e.g., by one or more of the antennas 101 (FIG. 1)).

In some dual-mode embodiments for Wi-Fi communication, the FEM circuitry 200 may be configured to operate in either the 2.4 GHz frequency spectrum or the 5 GHz frequency spectrum. In these embodiments, the receive signal path of the FEM circuitry 200 may include a receive signal path duplexer 204 to separate the signals from each spectrum as well as provide a separate LNA 206 for each spectrum as shown. In these embodiments, the transmit signal path of the FEM circuitry 200 may also include a power amplifier 210 and a filter 212, such as a BPF, a LPF or another type of filter for each frequency spectrum and a transmit signal path duplexer 214 to provide the signals of one of the different spectrums onto a single transmit path for subsequent transmission by the one or more of the antennas 101 (FIG. 1). In some embodiments, BT communications may utilize the 2.4 GHZ signal paths and may utilize the same FEM circuitry 200 as the one used for WLAN communications.

Figure 3:
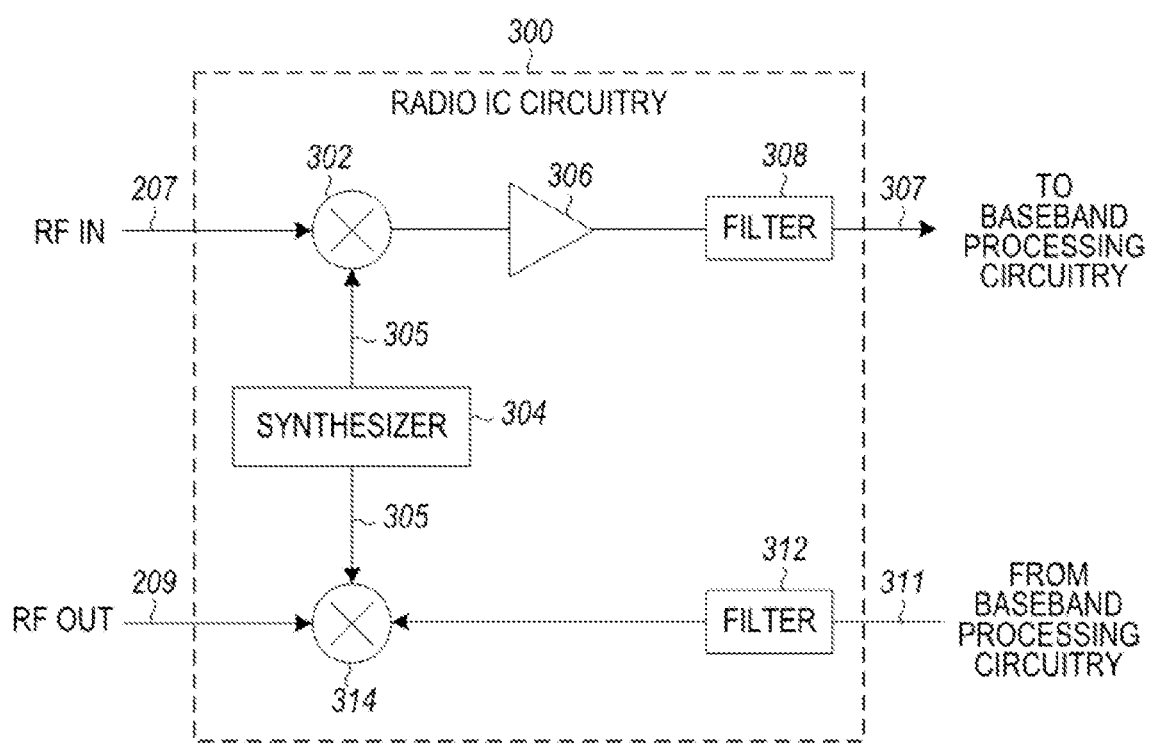
FIG. 3 illustrates a radio IC circuitry for use in the radio architecture of FIG. 1 in accordance with some embodiments.

FIG. 3 illustrates radio IC circuitry 300 in accordance with some embodiments. The radio IC circuitry 300 is one example of circuitry that may be suitable for use as the WLAN or BT radio IC circuitry 106A/106B (FIG. 1), although other circuitry configurations may also be suitable.

In some embodiments, the radio IC circuitry 300 may include a receive signal path and a transmit signal path. The receive signal path of the radio IC circuitry 300 may include at least mixer circuitry 302, such as, for example, down-conversion mixer circuitry, amplifier circuitry 306 and filter circuitry 308. The transmit signal path of the radio IC circuitry 300 may include at least filter circuitry 312 and mixer circuitry 314, such as, for example, up-conversion mixer circuitry. Radio IC circuitry 300 may also include synthesizer circuitry 304 for synthesizing a frequency 305 for use by the mixer circuitry 302 and the mixer circuitry 314. The mixer circuitry 302 and/or 314 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 3 illustrates only a simplified version of a radio IC circuitry, and may include, although not shown, embodiments where each of the depicted circuitries may include more than one component. For instance, mixer circuitry 320 and/or 314 may each include one or more mixers, and filter circuitries 308 and/or 312 may each include one or more filters, such as one or more BPFs and/or LPFs according to application needs. For example, when mixer circuitries are of the direct-conversion type, they may each include two or more mixers.

In some embodiments, mixer circuitry 302 may be configured to down-convert RF signals 207 received from the FEM circuitry 104 (FIG. 1) based on the synthesized frequency 305 provided by synthesizer circuitry 304. The amplifier circuitry 306 may be configured to amplify the down-converted signals and the filter circuitry 308 may include a LPF configured to remove unwanted signals from the down-converted signals to generate output baseband signals 307. Output baseband signals 307 may be provided to the baseband processing circuitry 108 (FIG. 1) for further processing. In some embodiments, the output baseband signals 307 may be zero-frequency baseband signals, although this is not a requirement. In some embodiments, mixer circuitry 302 may comprise passive mixers, although the scope of the embodiments is not limited in this respect.

In some embodiments, the mixer circuitry 314 may be configured to up-convert input baseband signals 311 based on the synthesized frequency 305 provided by the synthesizer circuitry 304 to generate RF output signals 209 for the FEM circuitry 104. The baseband signals 311 may be provided by the baseband processing circuitry 108 and may be filtered by filter circuitry 312. The filter circuitry 312 may include a LPF or a BPF, although the scope of the embodiments is not limited in this respect.

In some embodiments, the mixer circuitry 302 and the mixer circuitry 314 may each include two or more mixers and may be arranged for quadrature down-conversion and/or up-conversion respectively with the help of synthesizer 304. In some embodiments, the mixer circuitry 302 and the mixer circuitry 314 may each include two or more mixers each configured for image rejection (e.g., Hartley image rejection). In some embodiments, the mixer circuitry 302 and the mixer circuitry 314 may be arranged for direct down-conversion and/or direct up-conversion, respectively. In some embodiments, the mixer circuitry 302 and the mixer circuitry 314 may be configured for super-heterodyne operation, although this is not a requirement.

Mixer circuitry 302 may comprise, according to one embodiment: quadrature passive mixers (e.g., for the in-phase (I) and quadrature phase (Q) paths). In such an embodiment, RF input signal 207 from FIG. 3 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency ($f_{LO}$) from a local oscillator or a synthesizer, such as LO frequency 305 of synthesizer 304 (FIG. 3). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have a 25% duty cycle and a 50% offset. In some embodiments, each branch of the mixer circuitry (e.g., the in-phase (I) and quadrature phase (Q) path) may operate at a 25% duty cycle, which may result in a significant reduction is power consumption.

The RF input signal 207 (FIG. 2) may comprise a balanced signal, although the scope of the embodiments is not limited in this respect. The I and Q baseband output signals may be provided to low-nose amplifier, such as amplifier circuitry 306 (FIG. 3) or to filter circuitry 308 (FIG. 3).

In some embodiments, the output baseband signals 307 and the input baseband signals 311 may be analog baseband signals, although the scope of the embodiments is not limited in this respect. In some alternate embodiments, the output baseband signals 307 and the input baseband signals 311 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 304 may be a fractional-N synthesizer or a fractional N/N+1 synthesizer, although the scope of the embodiments is not limited in this respect as other types of frequency synthesizers may be suitable. For example, synthesizer circuitry 304 may be a delta-sigma synthesizer, a frequency multiplier, or a synthesizer comprising a phase-locked loop with a frequency divider. According to some embodiments, the synthesizer circuitry 304 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 304 may be provided by a voltage controlled oscillator (VCO), although that is not a requirement. A divider control input may further be provided by either the baseband processing circuitry 108 (FIG. 1) or the application processor 111 (FIG. 1) depending on the desired output frequency 305. In some embodiments, a divider control input (e.g., N) may be determined from a look-up table (e.g., within a Wi-Fi card) based on a channel number and a channel center frequency as determined or indicated by the application processor 111.

In some embodiments, synthesizer circuitry 304 may be configured to generate a carrier frequency as the output frequency 305, while in other embodiments, the output frequency 305 may be a fraction of the carrier frequency (e.g., one-half the carrier frequency, one-third the carrier frequency). In some embodiments, the output frequency 305 may be a LO frequency ($f_{LO}$).

Figure 4:
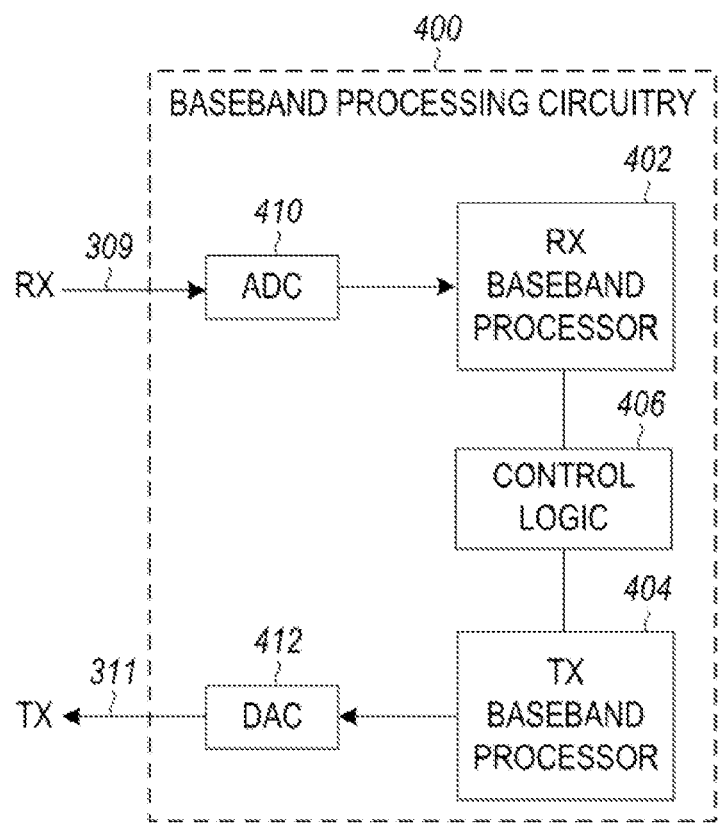
FIG. 4 illustrates a baseband processing circuitry for use in the radio architecture of FIG. 1 in accordance with some embodiments.

FIG. 4 illustrates a functional block diagram of baseband processing circuitry 400 in accordance with some embodiments. The baseband processing circuitry 400 is one example of circuitry that may be suitable for use as the baseband processing circuitry 108 (FIG. 1), although other circuitry configurations may also be suitable. The baseband processing circuitry 400 may include a receive baseband processor (RX BBP) 402 for processing receive baseband signals 309 provided by the radio IC circuitry 106 (FIG. 1) and a transmit baseband processor (TX BBP) 404 for generating transmit baseband signals 311 for the radio IC circuitry 106. The baseband processing circuitry 400 may also include control logic 406 for coordinating the operations of the baseband processing circuitry 400.

In some embodiments (e.g., when analog baseband signals are exchanged between the baseband processing circuitry 400 and the radio IC circuitry 106), the baseband processing circuitry 400 may include ADC 410 to convert analog baseband signals received from the radio IC circuitry 106 to digital baseband signals for processing by the RX BBP 402. In these embodiments, the baseband processing circuitry 400 may also include DAC 412 to convert digital baseband signals from the TX BBP 404 to analog baseband signals.

In some embodiments that communicate OFDM signals or OFDMA signals, such as through baseband processor 108A, the transmit baseband processor 404 may be configured to generate OFDM or OFDMA signals as appropriate for transmission by performing an inverse fast Fourier transform (IFFT). The receive baseband processor 402 may be configured to process received OFDM signals or OFDMA signals by performing an FFT. In some embodiments, the receive baseband processor 402 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1, in some embodiments, the antennas 101 (FIG. 1) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 101 may each include a set of phased-array antennas, although embodiments are not so limited.

Although the radio-architecture 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Figure 5:
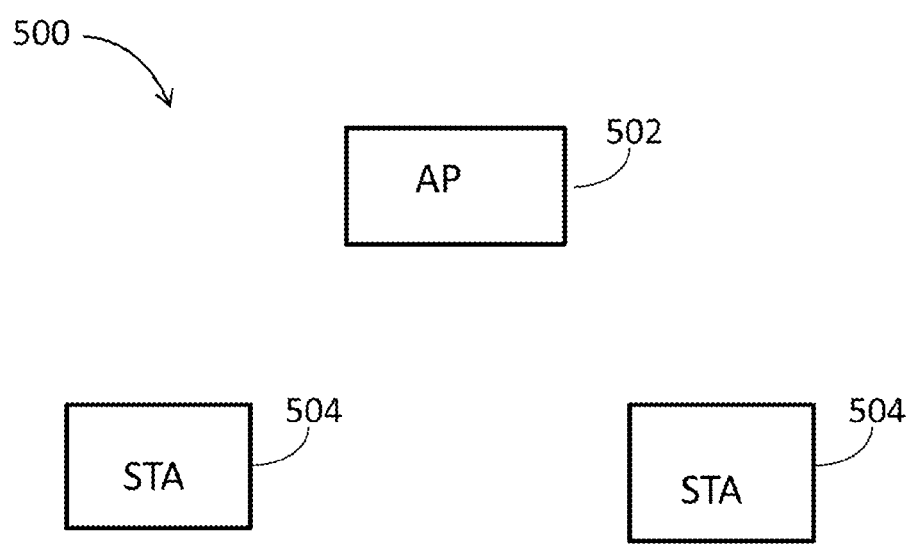
FIG. 5 illustrates a WLAN in accordance with some embodiments.

FIG. 5 illustrates a WLAN 500 in accordance with some embodiments. In some embodiments, the WLAN 500 may comprise an AP 502, and one or more stations (STAs) 504. Embodiments are not limited to the number of elements (such as APs 502, STAs 504 and/or other) shown in FIG. 5.

In some embodiments, the AP 502 may communicate with one or more of the STAs 504. Embodiments are not limited to a single AP 502, as the WLAN 500 may comprise one or more APs 502, in some embodiments. In some embodiments, the AP 502 may be a base station. The AP 502 and/or STAs 504 may use other communications protocols as well as the IEEE 802.11 protocol. The IEEE 802.11 protocol may be IEEE 802.11ax. The IEEE 802.11 protocol may include using orthogonal frequency division multiple-access (OFDMA), time division multiple access (TDMA), and/or code division multiple access (CDMA). The IEEE 802.11 protocol may include a multiple access technique. For example, the IEEE 802.11 protocol may include space-division multiple access (SDMA) and/or multiple-user multiple-input multiple-output (MU-MIMO).

The AP 502 and/or STAs 504 may operate in accordance with one or more of IEEE 802.11 a/b/g/n/ac/ad/af/ah/aj/ay, or another legacy wireless communication standard. In some embodiments, the STAs 504 may be wireless transmit and receive devices such as cellular telephone, portable electronic wireless communication devices, smart telephone, handheld wireless device, wireless glasses, wireless watch, wireless personal device, tablet, or another device that may be transmitting and receiving using the IEEE 802.11 protocol such as IEEE 802.11ax or another wireless protocol.

The bandwidth of a channel may be 20 MHz, 40 MHz, or 80 MHz, 160 MHz, 320 MHz contiguous bandwidths or an 80+80 MHz (160 MHz) non-contiguous bandwidth. In some embodiments, the bandwidth of a channel may be 1 MHz, 1.25 MHz, 2.03 MHz, 2.5 MHz, 4.06 MHz, 5 MHz and 10 MHz, or a combination thereof or another bandwidth that is less or equal to the available bandwidth may also be used. In some embodiments the bandwidth of the channels may be based on a number of active data subcarriers. In some embodiments the bandwidth of the channels is based on 26, 52, 106, 242, 484, 996, or 2×996 active data subcarriers or tones that are spaced by 20 MHz. In some embodiments the bandwidth of the channels is 256 tones spaced by 20 MHz. In some embodiments the channels are multiple of 26 tones or a multiple of 20 MHz. In some embodiments a 20 MHz channel may comprise 242 active data subcarriers or tones, which may determine the size of a Fast Fourier Transform (FFT). An allocation of a bandwidth or a number of tones or sub-carriers may be termed a resource unit (RU) allocation in accordance with some embodiments.

In some embodiments, the 26-subcarrier RU and 52-subcarrier RU are used in the 20 MHz, 40 MHz, 80 MHz, 160 MHz and 80+80 MHz OFDMA HE PPDU formats. In some embodiments, the 106-subcarrier RU is used in the 20 MHz, 40 MHz, 80 MHz, 160 MHz and 80+80 MHz OFDMA and MU-MIMO HE PPDU formats. In some embodiments, the 242-subcarrier RU is used in the 40 MHz, 80 MHz, 160 MHz and 80+80 MHz OFDMA and MU-MIMO HE PPDU formats. In some embodiments, the 484-subcarrier RU is used in the 80 MHz, 160 MHz and 80+80 MHz OFDMA and MU-MIMO HE PPDU formats. In some embodiments, the 996-subcarrier RU is used in the 160 MHz and 80+80 MHz OFDMA and MU-MIMO HE PPDU formats.

A frame and/or MAC protocol data unit (MPDU) may be configured for transmitting a number of spatial streams, which may be in accordance with MU-MIMO and may be in accordance with OFDMA. In other embodiments, the AP 502, STA 504, and/or other device may also implement different technologies such as code division multiple access (CDMA) 2000, CDMA 2000 1x, CDMA 2000 Evolution-Data Optimized (EV-DO), Interim Standard 2000 (IS-2000), Interim Standard 95 (IS-95), Interim Standard 856 (IS-856), Long Term Evolution (LTE), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)), BlueTooth®, or other technologies.

In example embodiments, the radio architecture of FIG. 1, the front-end module circuitry of FIG. 2, the radio IC circuitry of FIG. 3, and/or the baseband processing circuitry of FIG. 4 may be configured to perform the methods and operations/functions herein described in conjunction with one or more of the figures described herein.

In example embodiments, the STA 504 and/or the AP 502 are configured to perform the methods and operations/functions described herein in conjunction with one or more of the figures described herein. In example embodiments, an apparatus of the STA 504 and/or an apparatus of the AP 502 are configured to perform the methods and functions described herein in conjunction with one or more of the figures described herein. The term Wi-Fi may refer to one or more of the IEEE 802.11 communication standards.

Figure 6:
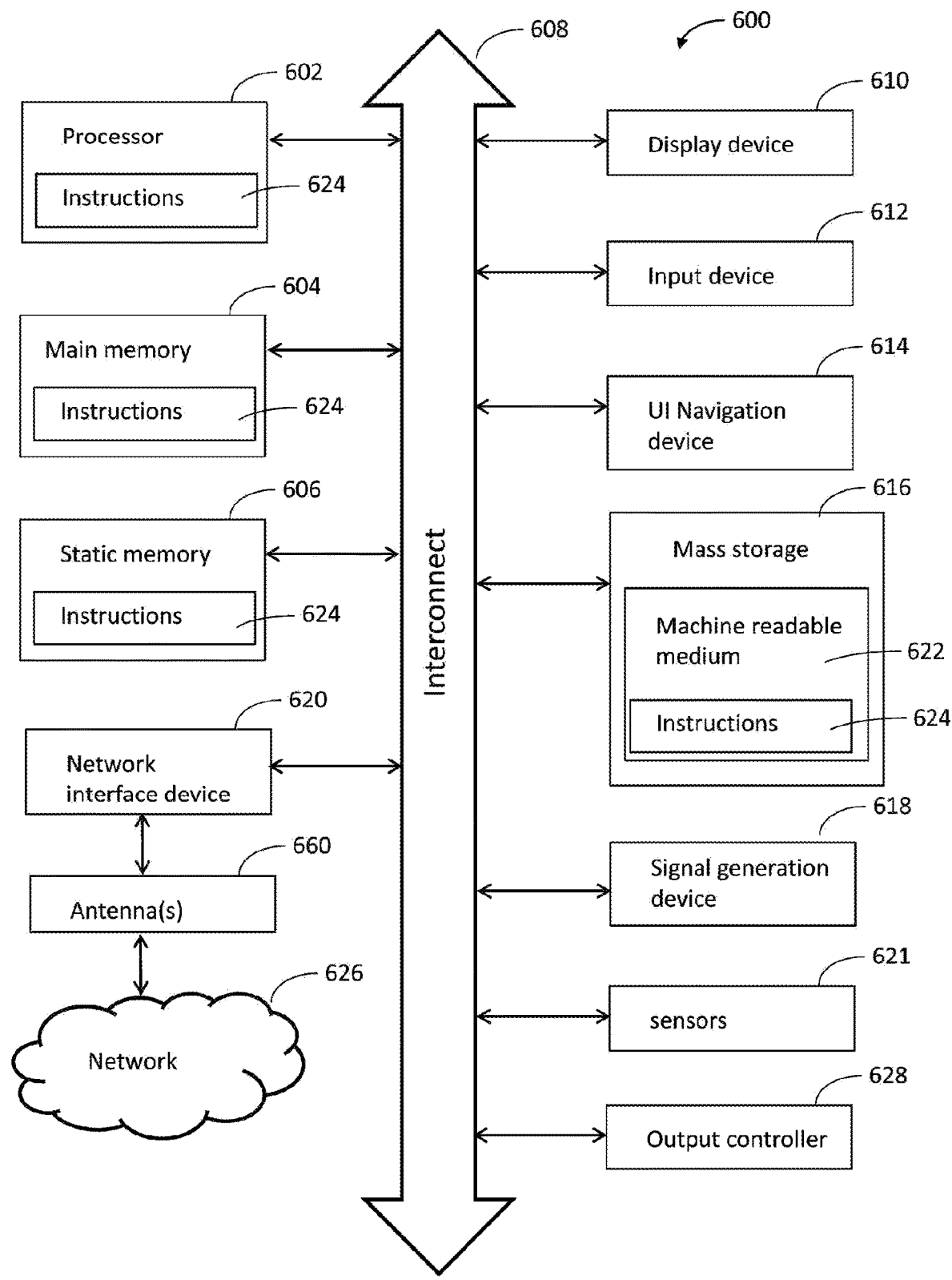
FIG. 6 illustrates a block diagram of an example machine upon which any one or more of the techniques (e.g., methodologies) discussed herein may perform.

FIG. 6 illustrates a block diagram of an example machine 600 upon which any one or more of the techniques (e.g., methodologies) discussed herein may perform. In alternative embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environment. The machine 600 may be an AP 502, STA 504, personal computer (PC), a tablet PC, a set-top box (STB), a personal digital assistant (PDA), a portable communications device, a mobile telephone, a smart phone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via an interlink (e.g., bus) 608.

Specific examples of main memory 604 include Random Access Memory (RAM), and semiconductor memory devices, which may include, in some embodiments, storage locations in semiconductors such as registers. Specific examples of static memory 606 include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; RAM; and CD-ROM and DVD-ROM disks.

The machine 600 may further include a display device 610, an input device 612 (e.g., a keyboard), and a user interface (UI) navigation device 614 (e.g., a mouse). In an example, the display device 610, input device 612 and UI navigation device 614 may be a touch screen display. The machine 600 may additionally include a mass storage (e.g., drive unit) 616, a signal generation device 618 (e.g., a speaker), a network interface device 620, and one or more sensors 621, such as a global positioning system (GPS) sensor, compass, accelerometer, or other sensor. The machine 600 may include an output controller 628, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.). In some embodiments the processor 602 and/or instructions 624 may comprise processing circuitry and/or transceiver circuitry.

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within static memory 606, or within the hardware processor 602 during execution thereof by the machine 600. In an example, one or any combination of the hardware processor 602, the main memory 604, the static memory 606, or the storage device 616 may constitute machine readable media.

Specific examples of machine readable media may include: non-volatile memory, such as semiconductor memory devices (e.g., EPROM or EEPROM) and flash memory devices; magnetic disks, such as internal hard disks and removable disks, magneto-optical disks; RAM; and CD-ROM and DVD-ROM disks.

While the machine readable medium 622 is illustrated as a single medium, the term "machine readable medium" may include a single medium or multiple media (e.g., a centralized or distributed database, and/or associated caches and servers) configured to store the one or more instructions 624.

An apparatus of the machine 600 may be one or more of a hardware processor 602 (e.g., a central processing unit (CPU), a graphics processing unit (GPU), a hardware processor core, or any combination thereof), a main memory 604 and a static memory 606, sensors 621, network interface device 620, antennas 660, a display device 610, an input device 612, a UI navigation device 614, a mass storage 616, instructions 624, a signal generation device 618, and an output controller 628. The apparatus may be configured to perform one or more of the methods and/or operations disclosed herein. The apparatus may be intended as a component of the machine 600 to perform one or more of the methods and/or operations disclosed herein, and/or to perform a portion of one or more of the methods and/or operations disclosed herein. In some embodiments, the apparatus may include a pin or other means to receive power. In some embodiments, the apparatus may include power conditioning hardware.

The term "machine readable medium" may include any medium that is capable of storing, encoding, or carrying instructions for execution by the machine 600 and that cause the machine 600 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, machine readable media may include non-transitory machine readable media. In some examples, machine readable media may include machine readable media that is not a transitory propagating signal. In some examples, machine readable media may include non-transitory computer readable storage media. In some examples, machine readable media may include computer readable storage media.

The instructions 624 may further be transmitted or received over a communications network 626 using a transmission medium via the network interface device 620 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others.

In an example, the network interface device 620 may include one or more physical jacks (e.g., Ethernet, coaxial, or phone jacks) or one or more antennas to connect to the communications network 626. In an example, the network interface device 620 may include one or more antennas 660 to wirelessly communicate using at least one of single-input multiple-output (SIMO), multiple-input multiple-output (MIMO), or multiple-input single-output (MISO) techniques. In some examples, the network interface device 620 may wirelessly communicate using Multiple User MIMO techniques. The term "transmission medium" shall be taken to include any intangible medium that is capable of storing, encoding or carrying instructions for execution by the machine 600, and includes digital or analog communications signals or other intangible medium to facilitate communication of such software.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Some embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; flash memory, etc.

Figure 7:
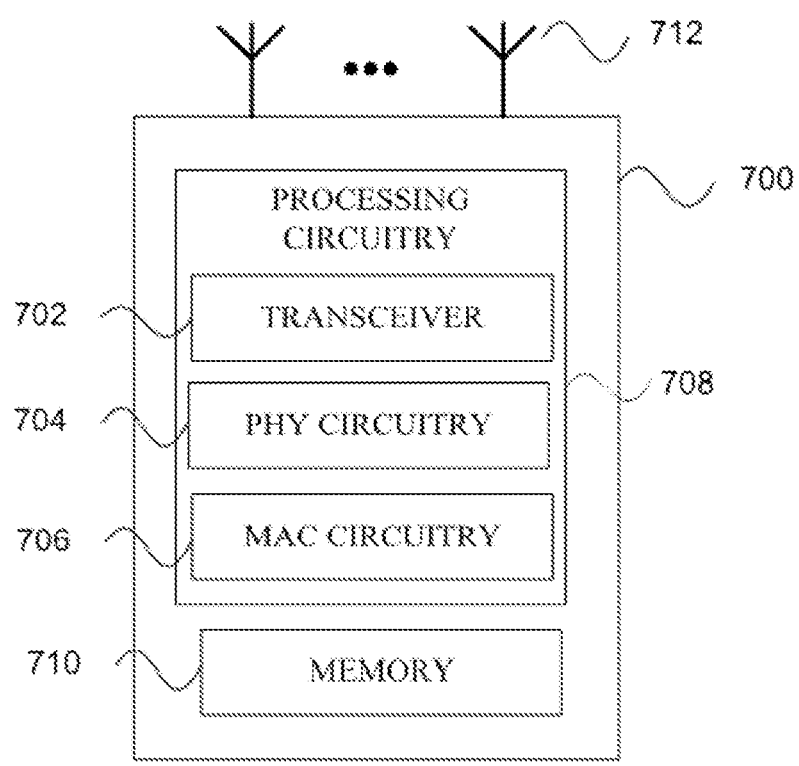
FIG. 7 illustrates a block diagram of an example wireless device upon which any one or more of the techniques (e.g., methodologies or operations) discussed herein may perform.

FIG. 7 illustrates a block diagram of an example wireless device 700 upon which any one or more of the techniques (e.g., methodologies or operations) discussed herein may perform. The wireless device 700 may be a HE device. The wireless device 700 may be an AP 502 and/or STA 504 (e.g., FIG. 5). An STA 504 and/or AP 502 may include some or all of the components shown in FIGS. 1-7. The wireless device 700 may be an example machine 600 as disclosed in conjunction with FIG. 6.

The wireless device 700 may include processing circuitry 708. The processing circuitry 708 may include a transceiver 702, physical layer circuitry (PHY circuitry) 704, and MAC layer circuitry (MAC circuitry) 706, one or more of which may enable transmission and reception of signals to and from other wireless devices 700 (e.g., AP 502, STA 504 and/or other devices) using one or more antennas 712. As an example, the PHY circuitry 704 may perform various encoding and decoding functions that may include formation of baseband signals for transmission and decoding of received signals. As another example, the transceiver 702 may perform various transmission and reception functions such as conversion of signals between a baseband range and a Radio Frequency (RF) range.

Accordingly, the PHY circuitry 704 and the transceiver 702 may be separate components or may be part of a combined component, e.g., processing circuitry 708. In addition, some of the described functionality related to transmission and reception of signals may be performed by a combination that may include one, any or all of the PHY circuitry 704 the transceiver 702, MAC circuitry 706, memory 710, and other components or layers. The MAC circuitry 706 may control access to the wireless medium. The wireless device 700 may also include memory 710 arranged to perform the operations described herein, e.g., some of the operations described herein may be performed by instructions stored in the memory 710.

The antennas 712 (some embodiments may include only one antenna) may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 712 may be effectively separated to take advantage of spatial diversity and the different channel characteristics that may result.

One or more of the memory 710, the transceiver 702, the PHY circuitry 704, the MAC circuitry 706, the antennas 712, and/or the processing circuitry 708 may be coupled with one another. Moreover, although memory 710, the transceiver 702, the PHY circuitry 704, the MAC circuitry 706, the antennas 712 are illustrated as separate components, one or more of memory 710, the transceiver 702, the PHY circuitry 704, the MAC circuitry 706, the antennas 712 may be integrated in an electronic package or chip.

In some embodiments, the wireless device 700 may be a mobile device as described in conjunction with FIG. 6. In some embodiments the wireless device 700 may be configured to operate in accordance with one or more wireless communication standards as described herein (e.g., as described in conjunction with FIGS. 1-6, IEEE 802.11). In some embodiments, the wireless device 700 may include one or more of the components as described in conjunction with FIG. 6 (e.g., display device 610, input device 612, etc.) Although the wireless device 700 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

In some embodiments, an apparatus of or used by the wireless device 700 may include various components of the wireless device 700 as shown in FIG. 7 and/or components from FIGS. 1-6. Accordingly, techniques and operations described herein that refer to the wireless device 700 may be applicable to an apparatus for a wireless device 700 (e.g., AP 502 and/or STA 504), in some embodiments. In some embodiments, the wireless device 700 is configured to decode and/or encode signals, packets, and/or frames as described herein, e.g., PPDUs.

The PHY circuitry 704 may be arranged to transmit signals in accordance with one or more communication standards described herein. For example, the PHY circuitry 704 may be configured to transmit a HE PPDU. The PHY circuitry 704 may include circuitry for modulation/demodulation, upconversion/downconversion, filtering, amplification, etc. In some embodiments, the processing circuitry 708 may include one or more processors. The processing circuitry 708 may be configured to perform functions based on instructions being stored in a RAM or ROM, or based on special purpose circuitry. The processing circuitry 708 may include a processor such as a general purpose processor or special purpose processor. The processing circuitry 708 may implement one or more functions associated with antennas 712, the transceiver 702, the PHY circuitry 704, the MAC circuitry 706, and/or the memory 710. In some embodiments, the processing circuitry 708 may be configured to perform one or more of the functions/operations and/or methods described herein.

In accordance with some embodiments, the STA 504 may be configurable for wireless local area network (WLAN) communication in a channel. The channel may be configurable to support communication by incumbent devices. The communication by the incumbent devices may be prioritized over the WLAN communication. The channel may comprise a plurality of resource units (RUs). Each RU may comprise a contiguous plurality of resource elements (REs). The STA 504 may determine a portion of the channel occupied by an incumbent device. The STA 504 may refrain from communication in a first subset of RUs that overlap the portion of the channel occupied by the incumbent device. The STA 504 may determine a combined RU that comprises two or more RUs of a second subset of RUs that do not overlap the portion of the channel occupied by the incumbent device. The STA 504 may encode a physical layer convergence procedure protocol data unit (PPDU) for transmission in the combined RU. The PPDU may be encoded in accordance with joint coding across the RUs of the combined RU. These embodiments are described in more detail below.

Figure 8:
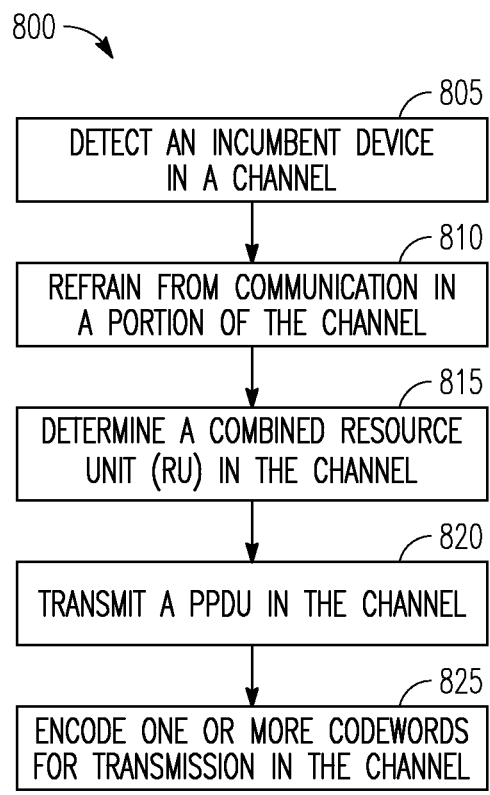
FIG. 8 illustrates the operation of a method in accordance with some embodiments.

FIG. 8 illustrates the operation of a method of communication in accordance with some embodiments. It is important to note that embodiments of the method 800 may include additional or even fewer operations or processes in comparison to what is illustrated in FIG. 8. In addition, embodiments of the method 800 are not necessarily limited to the chronological order that is shown in FIG. 8. In descriptions of the method 800, reference may be made to one or more figures, although it is understood that the method 800 may be practiced with any other suitable systems, interfaces and components.

In some embodiments, a STA 504 may perform one or more operations of the method 800, but embodiments are not limited to performance of the method 800 and/or operations of it by the STA 504. In some embodiments, another device and/or component may perform one or more operations that may be the same as, similar to and/or reciprocal to one or more operations of the method 800. In a non-limiting example, the AP 502 may perform an operation that may be the same as, similar to, reciprocal to and/or related to an operation of the method 800, in some embodiments.

The method 800 and other methods described herein may refer to APs 502, STAs 504 and/or other devices configured to operate in accordance with WLAN standards, 802.11 standards and/or other standards. However, embodiments are not limited to performance of those methods by those components, and may also be performed by other devices, such as an Evolved Node-B (eNB), User Equipment (UE) and/or other. In addition, the method 800 and other methods described herein may be practiced by wireless devices configured to operate in other suitable types of wireless communication systems, including systems configured to operate according to Third Generation Partnership Project (3GPP) standards, 3GPP Long Term Evolution (LTE) standards, 5G standards, New Radio (NR) standards and/or other standards.

In some embodiments, the method 800 and/or other method described herein may also be applicable to an apparatus of an AP 502, an apparatus of a STA 504 and/or an apparatus of another device. In some embodiments, an apparatus of a STA 504 may perform one or more operations of the method 800 and/or other operations. In some embodiments, an apparatus of an AP 502 may perform one or more operations that may be the same as, similar to, reciprocal to and/or related to one or more operations described herein.

It should also be noted that embodiments are not limited by references herein (such as in descriptions of the method 800 and/or other descriptions herein) to transmission, reception and/or exchanging of elements such as frames, messages, requests, indicators, signals or other elements. In some embodiments, such an element may be generated, encoded or otherwise processed by processing circuitry (such as by a baseband processor included in the processing circuitry) for transmission. The transmission may be performed by a transceiver or other component, in some cases. In some embodiments, such an element may be decoded, detected or otherwise processed by the processing circuitry (such as by the baseband processor). The element may be received by a transceiver or other component, in some cases. In some embodiments, the processing circuitry and the transceiver may be included in a same apparatus. The scope of embodiments is not limited in this respect, however, as the transceiver may be separate from the apparatus that comprises the processing circuitry, in some embodiments.

One or more of the elements (such as messages, operations and/or other) described herein may be included in a standard and/or protocol, including but not limited to WLAN, IEEE 802.11, EHT and/or other. The scope of embodiments is not limited to usage of those elements, however. In some embodiments, different elements, similar elements, alternate elements and/or other elements may be used. The scope of embodiments is also not limited to usage of elements that are included in standards.

At operation 805, the STA 504 may detect an incumbent device in a channel. At operation 810, the STA 504 may refrain from communication in a portion of the channel. At operation 815, the STA 504 may determine a combined resource unit (RU) in the channel. At operation 820, the STA 504 may transmit one or more PPDUs (and/or other element(s)) in the combined RU. At operation 825, the STA 504 may transmit one or more codewords (CWs) in the channel.

In some embodiments, the STA 504 may be configurable for wireless local area network (WLAN) communication in a channel. The channel may be configurable to support communication by incumbent devices. The communication by the incumbent devices may be prioritized over the WLAN communication. The channel may comprise a plurality of resource units (RUs). Each RU may comprise a contiguous plurality of resource elements (REs). The STA 504 may determine a portion of the channel occupied by an incumbent device. The STA 504 may refrain from communication in a first subset of RUs that overlap the portion of the channel occupied by the incumbent device. The STA 504 may determine a combined RU that comprises two or more RUs of a second subset of RUs that do not overlap the portion of the channel occupied by the incumbent device. The STA 504 may encode a physical layer convergence procedure protocol data unit (PPDU) for transmission in the combined RU. The PPDU may be encoded in accordance with joint coding across the RUs of the combined RU.

In some embodiments, as part of the joint coding, the STA 504 may perform one or more of: determine coded bits based on information bits; determine modulated symbols based on the coded bits; map the modulated symbols to the REs of the combined RU; and/or other.

In some embodiments, the STA 504 may determine the coded bits based on an encode operation that is based on a size of the combined RU. The size of the combined RU may be equal to a sum that includes sizes of the RUs that comprise the combined RU.

In some embodiments, as part of the joint coding, the STA 504 may interleave the coded bits. In some embodiments, as part of the joint coding, the STA 504 may interleave the modulated symbols. In some embodiments, the STA 504 may map the modulated symbols to the REs of the combined RU for orthogonal frequency division multiplexing (OFDM) transmission.

In some embodiments, the STA 504 may restrict the combined RU to include RUs of size that is greater than or equal to a predetermined minimum size. In a non-limiting example, the predetermined minimum size may be 242 REs. Other sizes, including but not limited to other numbers of REs, may be used in some embodiments.

In some embodiments, the STA 504 may be configurable for wireless local area network (WLAN) communication in a channel that is configurable to support communication by incumbent devices. The communication by the incumbent devices may be prioritized over the WLAN communication. The channel may comprise a plurality of resource units (RUs). Each RU may comprise a contiguous plurality of resource elements (REs). The STA 504 may perform one or more of: determine a portion of the channel occupied by an incumbent device; refrain from communication in a first subset of RUs that overlap the portion of the channel occupied by the incumbent device; determine a second subset of RUs that do not overlap the portion of the channel occupied by the incumbent device; encode one or more codewords (CWs) for transmission in the RUs of the second subset; and/or other. In some embodiments, the CWs may be encoded in accordance with independent coding for each of the RUs of the second subset.

In some embodiments, the STA 504 may, as part of the independent coding, for each of the RUs of the second subset, perform one or more of: determine coded bits based on information bits; determine modulated symbols based on the coded bits; map the modulated symbols to the REs of the RU; and/or other.

In some embodiments, the STA 504 may, as part of the independent coding, perform one or more of: for each of the RUs of the second subset, determine a codeword size independent of other RUs of the second subset; determine coded bits based on information bits; determine modulated symbols based on the coded bits; map the modulated symbols sequentially across multiple RUs of the second subset; and/or other.

In some embodiments, the STA 504 may map the modulated symbols sequentially across multiple RUs of the second subset for orthogonal frequency division multiplexing (OFDM) transmission.

In some embodiments, the STA 504 may encode a physical layer convergence procedure protocol data unit (PPDU) for transmission in a non-contiguous resource unit (RU) comprising two or more segments of resource elements (REs). In some embodiments, the REs of each segment may be spaced uniformly in frequency by a predetermined spacing. In some embodiments, the segments of REs may be disjoint in frequency. In some embodiments, to encode the PPDU, the STA 504 may perform one or more of: for a plurality of spatial streams, distribute bits of the spatial streams to different segments; for each of the segments, determine modulated symbols based on the bits of the segment, and interleave the modulated symbols; and/or other. In some embodiments, the STA 504 may, for each of the segments, map the modulated symbols to the REs of the segment for orthogonal frequency division multiplexing (OFDM) transmission.

In some embodiments, an apparatus of a STA 504 may comprise memory. The memory may be configurable to store one or more elements and the apparatus may use them for performance of one or more operations. The apparatus may include processing circuitry, which may perform one or more operations (including but not limited to operation(s) of the method 800 and/or other methods described herein). The processing circuitry may include a baseband processor. The baseband circuitry and/or the processing circuitry may perform one or more operations described herein, including but not limited to one or more operations of the method 800. The apparatus may include a transceiver to transmit and/or receive one or more blocks, messages and/or other elements.

Figure 9:
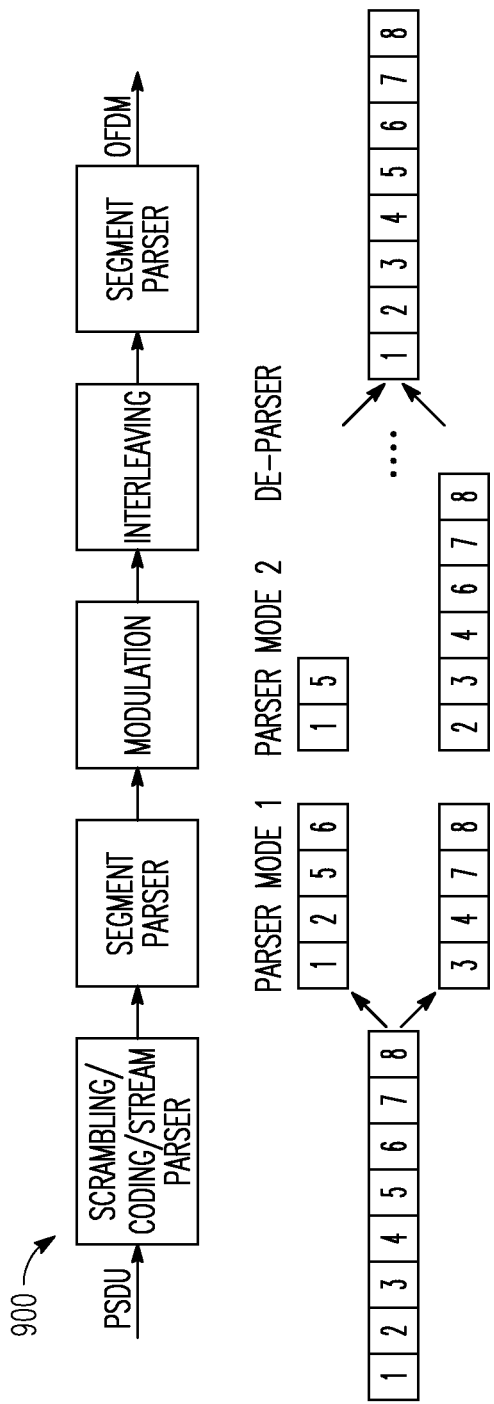
FIG. 9 illustrates example operations in accordance with some embodiments.
Figure 10:
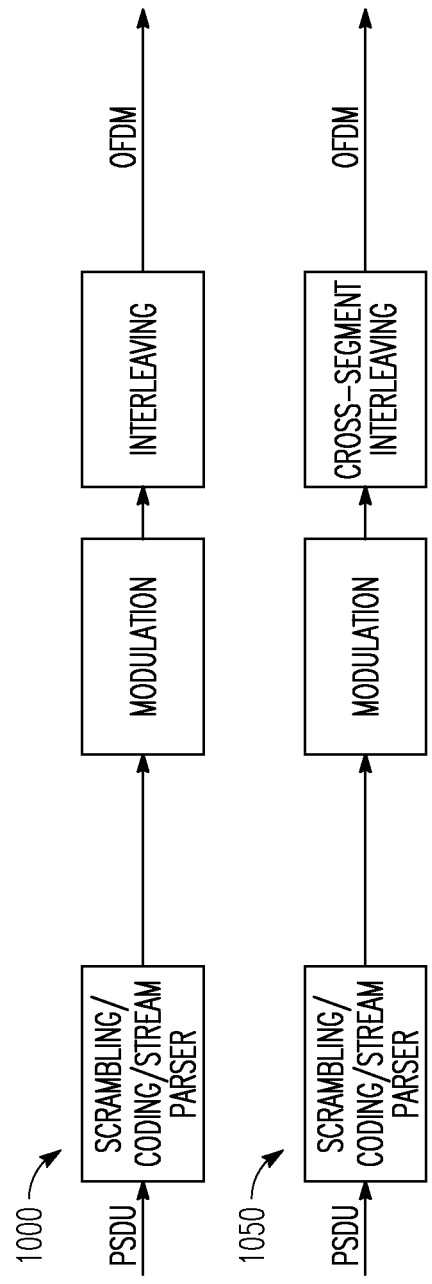
FIG. 10 illustrates example operations in accordance with some embodiments.
Figure 11:
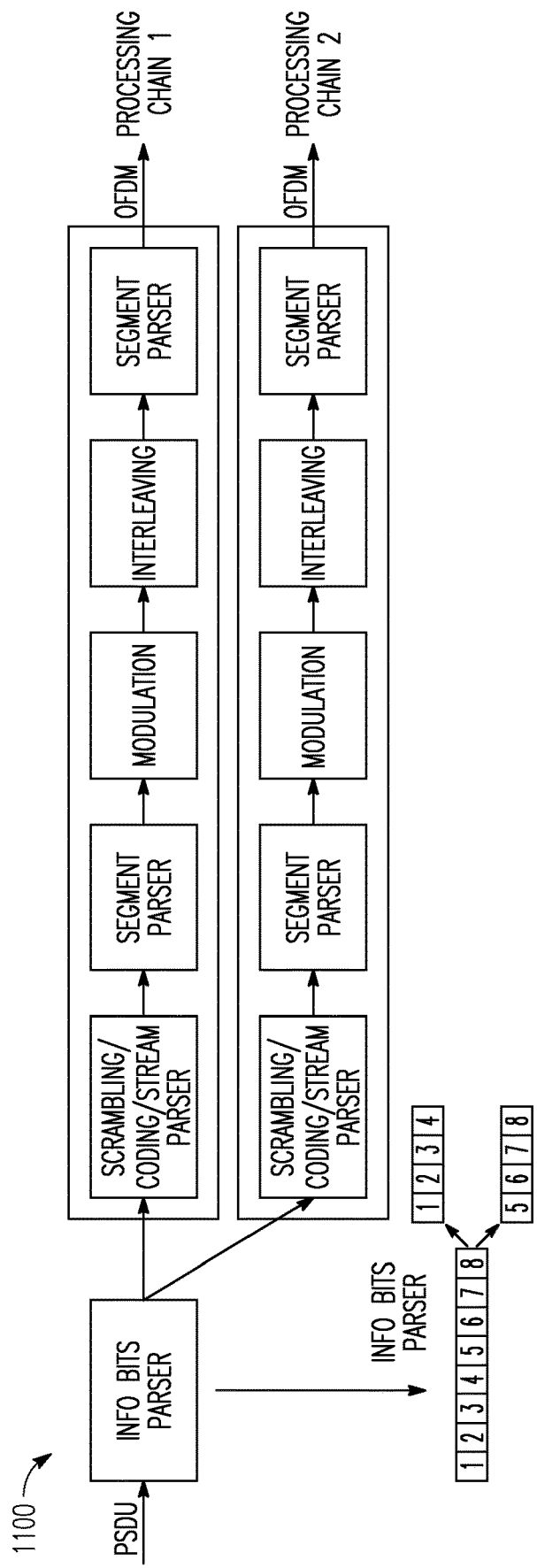
FIG. 11 illustrates example operations in accordance with some embodiments.
Figure 12:
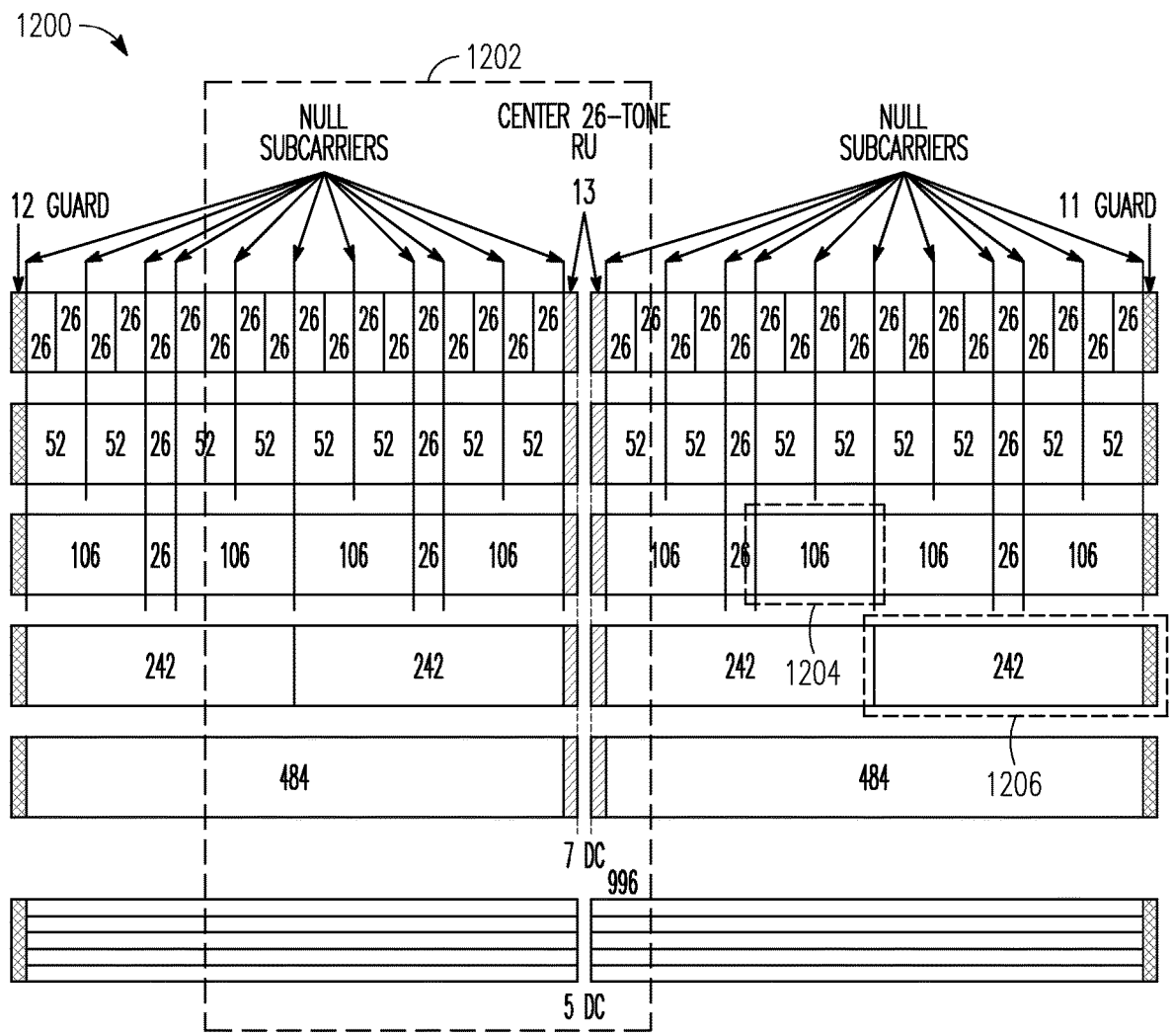
FIG. 12 illustrates example arrangements of frequency resources in accordance with some embodiments.
Figure 13:
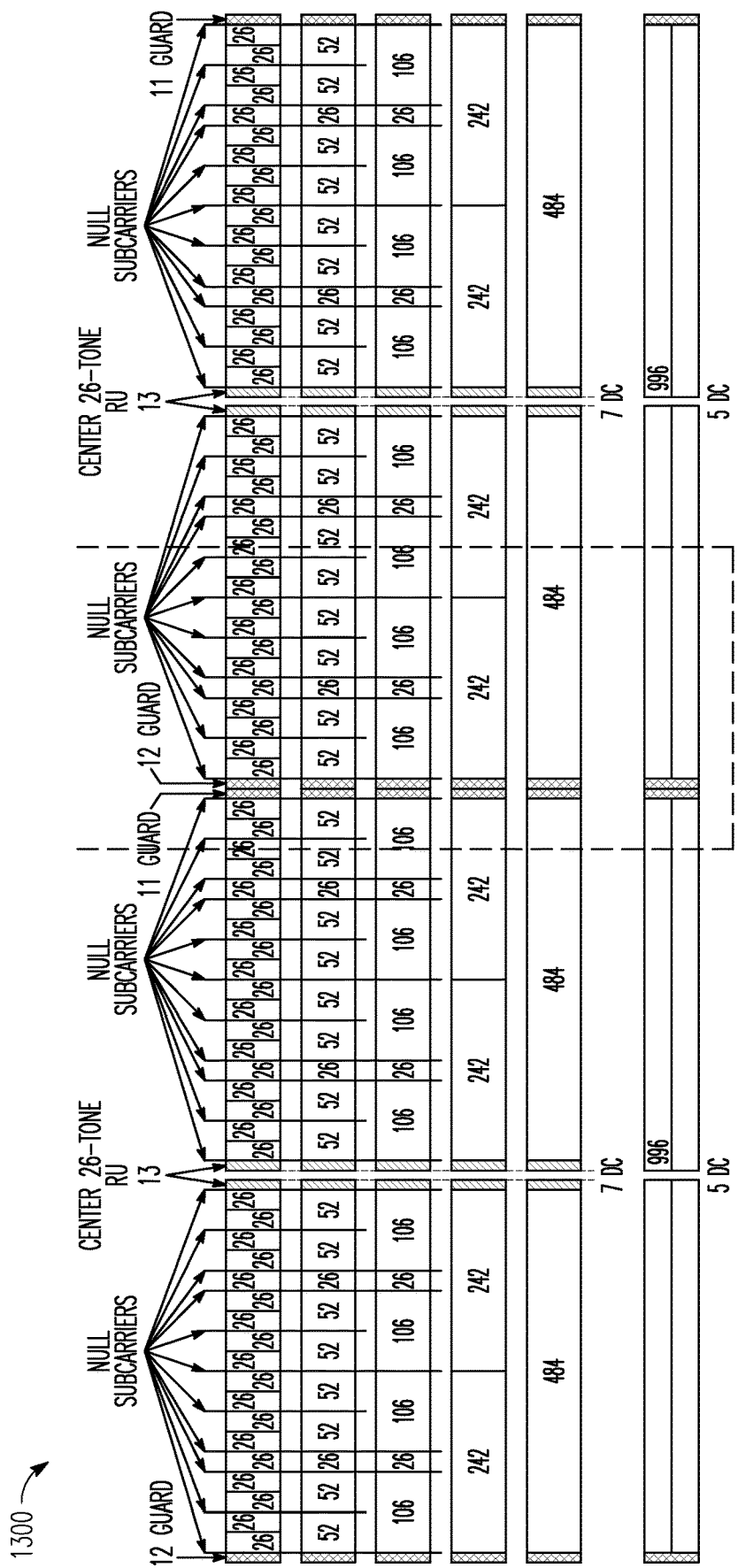
FIG. 13 illustrates example arrangements of frequency resources in accordance with some embodiments.
Figure 14:
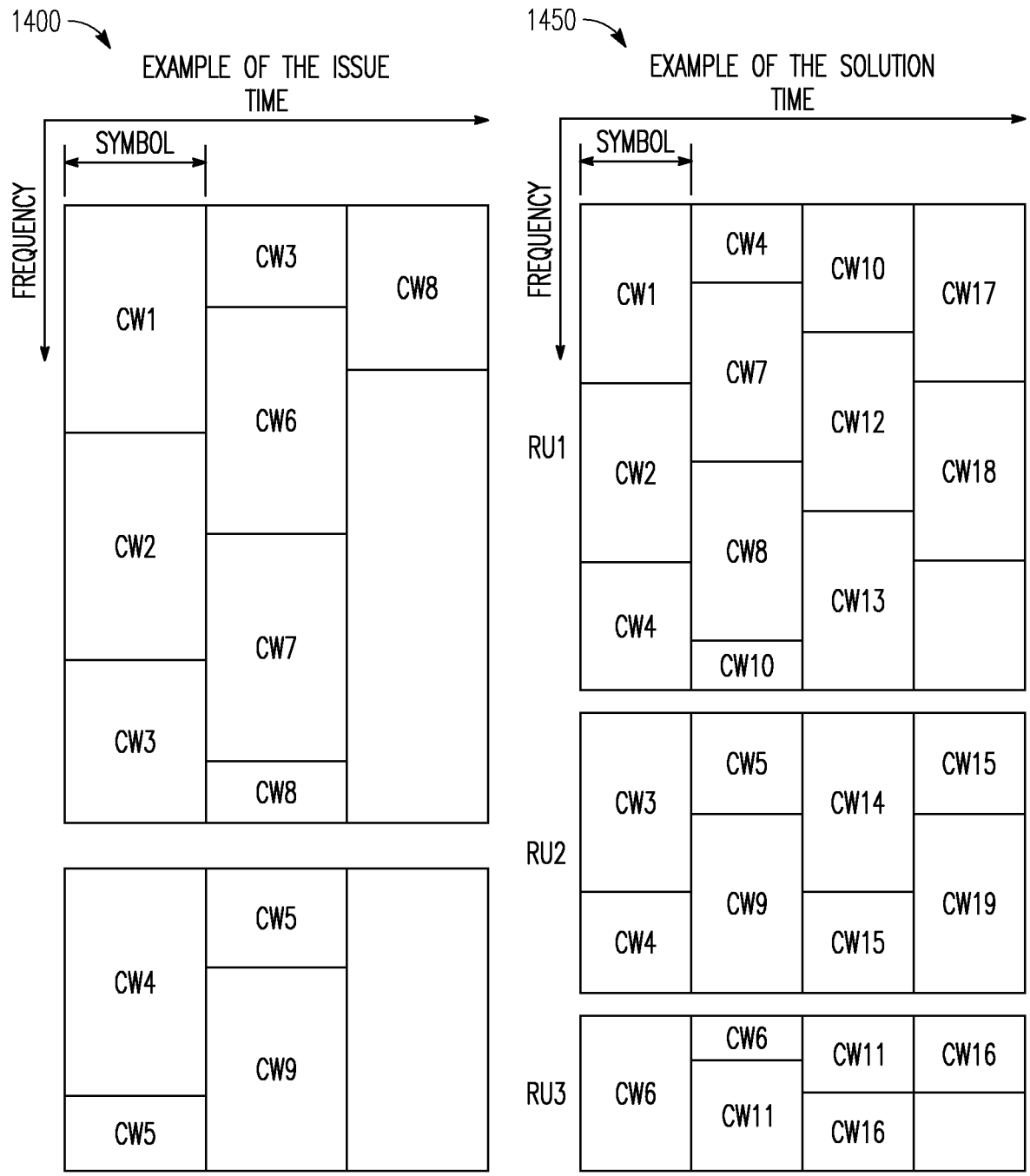
FIG. 14 illustrates example mappings of codewords to frequency resources in accordance with some embodiments.
Figure 15:
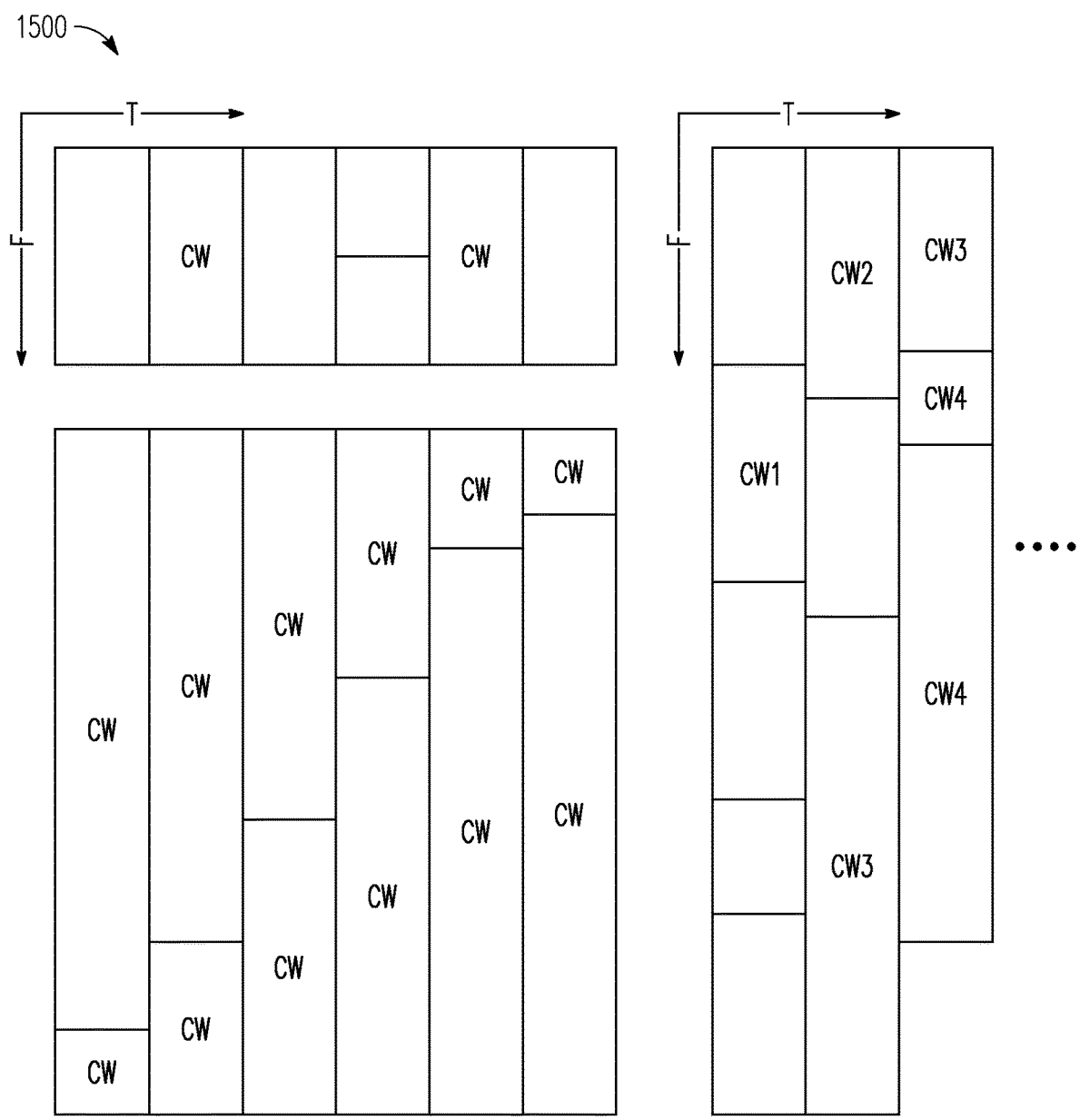
FIG. 15 illustrates example mappings of codewords to frequency resources in accordance with some embodiments.

FIG. 9 illustrates example operations in accordance with some embodiments. FIG. 10 illustrates example operations in accordance with some embodiments. FIG. 11 illustrates example operations in accordance with some embodiments. FIG. 12 illustrates example arrangements of frequency resources in accordance with some embodiments. FIG. 13 illustrates example arrangements of frequency resources in accordance with some embodiments. FIG. 14 illustrates example mappings of codewords to frequency resources in accordance with some embodiments. FIG. 15 illustrates example mappings of codewords to frequency resources in accordance with some embodiments. It should be noted that the examples shown in FIGS. 9-15 may illustrate some or all of the concepts and techniques described herein in some cases, but embodiments are not limited by the examples. For instance, embodiments are not limited by the name, number, type, size, ordering, arrangement of elements (such as devices, operations, messages and/or other elements) shown in FIGS. 9-15. Although some of the elements shown in the examples of FIGS. 9-15 may be included in a WLAN standard, Wi-Fi standard, 802.11 standard, and/or other standard, embodiments are not limited to usage of such elements that are included in standards.

Some embodiments may be related to frequency resource mapping for the non-continuous RU allocation in EHT. EHT will introduce non-continuous RU allocation. It means more than one frequency segment can be allocated to one client in a PPDU. In the legacy WiFi system, including 11ax, a segment parser/deparser is used to handle the frequency mapping if there are more than one frequency segments in one PPDU. If we follow the same implementation in EHT, one issue is the parser/deparser need to deal with a large number of combinations due to different RU sizes in different frequency segments in one PPDU. Some embodiments herein may be related to options to bypass the segment parser/deparser module and simplify the frequency mapping process for non-contiguous RU allocation.

Some embodiments may be related to non-continuous frequency mapping in one PPDU, including but not limited to one or more of the following: 1) remove segment parser/deparser in EHT; 2) add parameters for the new RU size of the non-contiguous frequency segments to enable cross-segments interleaving; 3) independent processing (coding, modulation, interleaving) within each frequency segment; 4) other.

In 11ax, the processing procedure 900 and segment parser/deparser at the transmitter are shown in FIG. 9 (assuming the PPDU bandwidth is 160 MHz or 80+80 MHz). After streaming parser, each spatial stream has a group of coding bits (bit 1~bit 8 in the example of FIG. 9). In order to reuse the 80 MHz interleaver (instead of define a new interleaver for 160 MHz), the group of bits are split to two groups in a predefined way. The method of splitting one group to two groups are defined by the segment parser.

There are mainly two factors affect the definition of the parser: the number of tones in each frequency segment and the modulation level. There are 6 modulation level in 11ax (BPSK~1024QAM), but the frequency segment combination is as simple as two segments with equal number of data tones in each segment. So the definition of segment parser in 11ax is not quite complicated (parser mode 1 in FIG. 9 is the 11ax 160 MHz segment parser assuming 16QAM is used).

However, EHT has larger band width and has more flexible RU puncturing mode. Such that defining the parser could be much more complicated in EHT due to the potential large number of RU size combinations in different frequency segments. For instance, after puncturing a 320 MHz/160+ 160 MHz channel we can get at least these RU combinations: 160+140 MHz, 160+120 MHz, 160+80 MHz, 80+80 MHz, 80+40 MHz, etc; After puncturing a 160 MHz/80+80 MHz channel, we can get at least these RU combinations: 80+60 MHz, 80+40 MHz, 60+40 MHz, etc. Parser mode 2 is an example of 160+40 MHz parser given 16QAM is used. Obviously, defining a parser mode for each RU combination impose heavy burden on standard and implementation.

Some embodiments may be related to techniques/methods to simplify the frequency mapping process across different non-contiguous frequency segments. In some embodiments (referred to for clarity as "Option 1"), removal of the segment parser/deparser as shown in 1000 in FIG. 10 may be performed. The segment parser/deparser, which are introduced in 11ac, is mainly used to achieve cross frequency segment diversity gain for the convolutional code. The BCC, however, has almost been obsoleted in 11ax. LDPC naturally has the gift of frequency diversity due to the structure of channel coding. In addition, EHT is introducing larger bandwidth. Such that most of the diversity gain can be achieved even within one frequency segment for LDPC code. Removing the segment parser/deparser will just marginally impact the performance. Some evaluation results on paper show that only 0.1~0.3 dB loss can be observed if the parser/deparser is removed.

In some embodiments (referred to for clarity as "Option 2"), the segment parser distributes the bits in each spatial stream to different segments with a round robin way. After that, the bits in one segment are modulated and interleaved by a block interleaver within this segment. So the segment parser is equivalent to a cross segment interleaver. To achieve the function of segment parser, another option is to replace the intra segment interleaver with inter segment/cross segment interleaver as shown in 1050 in FIG. 10.

One or more tables (including but not limited to one or more tables disclosed herein) may be related to an intra segment interleaver parameter for LDPC code in 11ax. To enable the block interleaver for different RU size, there is a dedicated D_tm for different RU. The principle to define D_tm is that the number of data tones in a RU, which is equivalent to the number of tones in a RU minus the number of pilot tones in the same RU, is dividable by D_tm. For instance, if we want to define a D_tm for 160+80 MHz, D_tm can be 140 or 60, which can divide (996−16)*3. If we want to define a D_tm for 80+40 MHz, D_tm can be 8 which can divide (996+484−32). One consideration is that for each new RU size in EHT a new D_tm needs to be defined. But it may be simpler than define parser/deparser for different RU combinations.

In some embodiments (referred to for clarity as "Option 3"), independent processing for each frequency segments can be considered as another option to bypass the complexity of defining the segment parser/deparser. As shown in FIG. 11, all of the procedures in the box of each processing chain is what we have in 11ax (as in FIG. 9). The only extra module is the info bits parser 1100. The function of the info bits parser is to distribute the info bits to different processing chain, such that each chain have similar number of OFDM symbols. For instance, if the two frequency segments are 80 MHz+40 Mhz, the info bits parser want to give the processing chain 1 twice the number of info bits as processing chain 2. Such that both processing chain end up with almost the same number of OFDM symbols. One potential consideration of this option is it could potentially affect the processing flow in the receiver. Because if the receiver process the received frequency blocks sequentially, it needs to buffer the frequency block which is pending for processing. Otherwise, the receiver has to have the capability of parallel processing both frequency blocks.

Some embodiments may be related to coding over multiple RUs in EHT. EHT will introduce non-continuous RU allocation. It means in one PPDU, more than one RU can be allocated to a STA. The channel coding options across these RUs are proposed in this disclosure. Some embodiments may be related to a puncture granularity for incumbent. Some embodiments may be related to channel coding across multiple Rus, including but not limited to one or more of the following: 1) joint encoding across multiple RUs; 2) independent encoding across multiple RUs, 3) other.

The EHT STAB will work on 6 GHz which has been used already by other wireless services, such as fixed satellite service, microwave backhaul, industry control and security. These services are called incumbent in 6 GHz. WiFi STA shall not interfere these existing receiver of incumbent. The mechanism of interference avoidance is EHT STA will puncture the frequency resources in a WiFi channel that is overlapped with one or more incumbent. An example of frequency resources 1200 is shown in FIG. 12. Reference number 1202 illustrates a 30 MHz incumbent which overlaps with 80 MHz wifi channel. For this case, the frequency resources covered by the incumbent, plus some guard tones, shall be punctured.

802.1 lax defines a puncture granularity of 242 tone RU, which means the frequency resources that are punctured can be indicated as N*242 tone. We propose to add another granularity which is finer than 242. We propose to use 106 RU and the adjacent 26 tone RU as the puncture granularity. i.e. if a 106 RU is punctured, the neighbor one or two 26 tone RU shall be punctured together. The finer puncturing granularity means better efficiency to collect the residual frequency resources.

Some embodiments may be related to SU PPDU with puncturing. After the frequency resources that overlap with the incumbent are punctured, there are at least two approaches to use the residual frequency resources. In some embodiments (referred to for clarity as "Alternative 1"), MU OFDMA may be used. For example in FIG. 12, the residual 106 tone RU on the left (reference number 1204) can be assigned to one STA. The 3rd 106 tone RU from the right side (reference number 1206) can be assigned to the 2nd STA. The 242 tone RU on the right can be assigned to a 3rd STA. This approach has minimum spec change but doesn't support aggregate the residual frequency resources to be a SU PPDU. I.e. no combo RU, 106+106+242, for SU PPDU.

In some embodiments (referred to for clarity as "Alternative 2"), a new RU may be defined to support SU PPDU. For example in FIG. 12, the three RUs 106+106+242 can be aggregated as a jumbo RU assigned to one STA. To support Alt.2, there are at least two options. In some embodiments (referred to for clarity as "option 1"), joint coding on multiple RUs may be used. Joint coding is described below. In some embodiments (referred to for clarity as "option 2"), independent encoding on multiple RUs may be used. Independent encoding on multiple RUs is described later herein.

In some embodiments, joint coding means for different incumbent we need to define a new RU which is a combination of the residual RUs. For the example in FIG. 12, a new RU of 106+106+242=454 tone RU needs to be defined. Then the channel coding and interleaving shall be done based on the new RU size. One issue is to determine the minimum RU size used to aggregate the SU PPDU. For the example of FIG. 12, we get the new RU of 106+106+242=454 tone with the assumption that 106 tone RU is the minimum RU for SU PPDU aggregation. If 52 tone RU is used as the minimum RU, we may get a new RU of 106+106+242+52=506 tone, which has more resource. However, a smaller RU for SU PPDU aggregation means more new RU sizes need to be supported. A good trade off we propose to use is 106 tone RU or 242 tone RU as the minimum RU for SU PPDU aggregation.

Using exhaustive search and/or other technique(s), one or more tables (including but not limited to one or more tables disclosed herein) may be determined, and may include the new RUs that need to be defined for joint coding. The pilot tones index in the jumbo RU can reuse the pilot tone index definition of each existing 11ax RU in the jumbo RU.

One or more tables (including but not limited to one or more tables disclosed herein) may include a proposed new RU size assuming 1) One incumbent overlaps with 80 MHz but not straddle two 80 MHz; 2) 106 tone RU is the minimum RU for SU PPDU aggregation.

One or more tables (including but not limited to one or more tables disclosed herein) may include a proposed new RU size assuming 1) One incumbent overlaps with 80 MHz but not straddle two 80 MHz; 2) 242 tone RU is the minimum RU for SU PPDU aggregation.

One or more tables (including but not limited to one or more tables disclosed herein) may include a proposed new RU size assuming 1) One incumbent straddles two 80 MHz; 2) 106 tone RU is the minimum RU for SU PPDU aggregation. Note: The frequency resources 1300 illustrated in FIG. 13 gives an example of one incumbent straddling two 80 MHz in 160 MHz PPDU.

One or more tables (including but not limited to one or more tables disclosed herein) may include a proposed new RU size assuming 1) One incumbent straddles two 80 MHz; 2) 242 tone RU is the minimum RU for SU PPDU aggregation.

Some embodiments are related to independent encoding on multiple RUs. In some embodiments, independent coding means channel coding and interleaving is done based on existing 11ax RU size. For the example of FIG. 12, if the 106 tone RU is the minimum RU to aggregate the SU PPDU, the residual three RUs, 106,106,242 RU are still coded independently instead of coding with a 106+106+242 tone jumbo RU. In this way, no new RU size need to be defined. 11ax RU size can be fully reused. We propose to limit the number of independent coded RU in the SU PPDU to be less than or equal to 3 to simplify the implementation. Also these RUs shall use the same MCS.

One issue of independent coding is shown in the left portion (1400) in FIG. 14. PHY process PPDU symbol by symbol. PHY want to pass the CW to MAC as long as PHY finish decoding instead of buffering any decoded CW in PHY. However, as shown in FIG. 13, CW4 in symbol 1 has to be buffered till CW3 in symbol 2 is decoded and pass to MAC. Same issue for CW 9 of symbol 2.

To solve this issue, we propose to define a parser to parse the coded bits to code word mapping. At least two parser options are possible. Parser option #1 is shown in the right portion (1450) in FIG. 14. Example rules for the transmitter and receiver may include one or more of the following. In some embodiments, the CW shall be indexed according to the CW priority (the transmitter will map the encoded bits to CW sequentially according to the priority of the CW). In some embodiments, one or more of the following may be applicable for the CW priority: 1) the CW that does not straddle two symbols has highest priority (if more than one CWs that don't straddle two symbols, their priority is the same as 11ax. i.e. indexed low to high frequency and time); 2) CWs that straddle more than one symbol have lower priority (if more than one CWs straddle the same number of symbol, their priority is the same as 11ax. i.e. indexed low to high frequency and time); 3) the number of symbols that a CW straddle across is calculated as: N_sym_total−(i_sym_current−i_sym_start); 4) other. In #3 above: N_sym_total is the total number of symbols a CW straddle across; i_sym_current is the index of the current symbol which transmitter/receiver is processing (mapping the constellation to or demapping the constellation from); i_sym_start is the index of the symbol that the first bit of a CW start from.

Parser option #2 1500 is shown in FIG. 15. Example rules for the transmitter and receiver may include one or more of the following. In some embodiments, CW is a container for the encoded bits. In some embodiments, container size (CW boundary) is calculated assuming each RU is independent coded. It means the CW boundary calculation in RU1 depends on the RU size of RU1; the CW boundary calculation in RU2 depends on the RU size of RU2. In this way, the calculation fully reuse 11ax defined parameters as in FIG. 15. In some embodiments, after all of the CW boundary is fixed, coded bits are loaded to each CW sequentially across multiple RUs instead of loading to one RU after another one. It means the coded bits are first loaded to the CW calculated in previous step, and then modulated to QAM constellation. But instead of mapping the constellation to the frequency resources used to determine the CW boundary, we propose to map the constellation sequentially across multiple RUs as in FIG. 15.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for an Extremely High-Throughput (EHT) Station (STA), the apparatus comprising: processing circuitry; and memory,
   wherein for transmission in an 80 MHz EHT physical layer convergence procedure protocol data unit (PPDU) using a multiple resource unit (RU) (MRU) in an 80 MHz bandwidth, the MRU comprising a first 242-tone RU and a 484-tone RU, the processing circuitry is configured to:
   jointly encode data only on tones of the first 242-tone RU and the 484-tone RU;
   puncture tones of a second 242-tone RU within the 80 MHz bandwidth prior transmission; and
   transmit the 80 MHz PPDU to an access point station (AP) in accordance with orthogonal frequency division multiple access (OFDMA) on the MRU,
   wherein the second 242-tone RU is assigned to another STA for transmission of a 20 MHz PPDU,
   wherein the 80 MHz bandwidth comprises first, second, third and fourth 20 MHz segments, the first 20 MHz segment comprising a lowest frequency region of the 80 MHz bandwidth, the fourth 20 MHz segment comprising a highest frequency region of the 80 MHz bandwidth, the second 20 MHz segment being higher in frequency than the first 20 MHz segment and adjacent to the first 20 MHz segment, and the third 20 MHz segment being lower in frequency than the fourth 20 MHz segment and adjacent to the fourth 20 MHz segment, wherein the 484-tone RU resides only in either the first and second 20 MHz segments or the third and fourth 20 MHz segments, and wherein:

when the first 242-tone RU resides in the first 20 MHz segment and the 484-tone RU resides in the third and fourth 20 MHz segments, the punctured tones of the second 242-tone RU reside in the second 20 MHz segment;

when the first 242-tone RU resides in the second 20 MHz segment and the 484-tone RU resides in the third and fourth 20 MHz segments, the punctured tones of the second 242-tone RU reside in the first 20 MHz segment;

when the first 242-tone RU resides in the third 20 MHz segment and the 484-tone RU resides in the first and second 20 MHz segments, the punctured tones of the second 242-tone RU reside in the fourth 20 MHz segment; and when the first 242-tone RU resides in the fourth 20 MHz segment and the 484-tone RU resides in the first and second 20 MHz segments, the punctured tones of the second 242-tone RU reside in the third 20 MHz segment.

2. The apparatus of claim 1, wherein for transmission of the 80 MHz EHT PPDU, the processing circuitry is further configured to:

refrain from encoding data on tones of the second 242-tone RU.

3. The apparatus of claim 2, wherein the EHT STA is a non-AP STA, and wherein the processing circuitry is configured to decode signalling from the AP that indicates an RU allocation comprising a size and location of each RU of the MRU.

4. The apparatus of claim 2, wherein the processing circuitry is further configured to determine a number of bits to be encoded based on a size of the MRU, wherein for the MRU, the size is based on a size of the 484-tone RU and a size of the 242-tone RU.

5. A non-transitory computer-readable storage medium that stores instructions for execution by processing circuitry of an Extremely High-Throughput (EHT) Station (STA), wherein for transmission of a 80 MHz physical layer convergence procedure protocol data unit (PPDU) using a multiple resource unit (RU) (MRU) in an 80 MHz bandwidth, the MRU comprising a first 242-tone RU and a 484-tone RU, the processing circuitry configured to:

jointly encode data only on tones of the first 242-tone RU and the 484-tone RU;

puncture tones of a second 242-tone RU within the 80 MHz bandwidth prior transmission; and transmit the 80 MHz PPDU to an access point station (AP) in accordance with orthogonal frequency division multiple access (OFDMA) on the MRU, wherein the second 242-tone RU is assigned to another STA for transmission of a 20 MHz PPDU, wherein the 80 MHz bandwidth comprises first, second, third and fourth 20 MHz segments, the first 20 MHz segment comprising a lowest frequency region of the 80 MHz bandwidth, the fourth 20 MHz segment comprising a highest frequency region of the 80 MHz bandwidth, the second 20 MHz segment being higher in frequency than the first 20 MHz segment and adjacent to the first 20 MHz segment, and the third 20 MHz segment being lower in frequency than the fourth 20 MHz segment and adjacent to the fourth 20 MHz segment, wherein the 484-tone RU resides only in either the first and second 20 MHz segments or the third and fourth 20 MHz segments, and wherein:

when the first 242-tone RU resides in the first 20 MHz segment and the 484-tone RU resides in the third and fourth 20 MHz segments, the punctured tones of the second 242-tone RU reside in the second 20 MHz segment;

when the first 242-tone RU resides in the second 20 MHz segment and the 484-tone RU resides in the third and fourth 20 MHz segments, the punctured tones of the second 242-tone RU reside in the first 20 MHz segment;

when the first 242-tone RU resides in the third 20 MHz segment and the 484-tone RU resides in the first and second 20 MHz segments, the punctured tones of the second 242-tone RU reside in the fourth 20 MHz segment; and when the first 242-tone RU resides in the fourth 20 MHz segment and the 484-tone RU resides in the first and second 20 MHz segments, the punctured tones of the second 242-tone RU reside in the third 20 MHz segment.

6. The non-transitory computer-readable storage medium of claim 5, wherein for transmission of the 80 MHz EHT PPDU, the processing circuitry is further configured to:

refrain from encoding data on tones of the second 242-tone RU o.

7. The non-transitory computer-readable storage medium of claim 6, wherein the EHT STA is a non-AP STA, and wherein the processing circuitry is configured to decode signalling from the AP that indicates an RU allocation comprising a size and location of each RU of the MRU.

8. The non-transitory computer-readable storage medium of claim 6, wherein the processing circuitry is further configured to determine a number of bits to be encoded based on a size of the MRU, wherein the size is based on a size of the 484-tone RU and a size of the 242-tone RU.

* * * * *